United States Patent
Wang et al.

(10) Patent No.: US 6,696,593 B2
(45) Date of Patent: Feb. 24, 2004

(54) PREPARATION OF UV-CURABLE URETHANE COMPOSITIONS

(75) Inventors: Wei Wang, Boothwyn, PA (US); Daniel B. Pourreau, Exton, PA (US)

(73) Assignee: Arco Chemical Technology, L.P., Greenville, DE (US)

( * ) Notice: Subject to any disclaimer, the term of this patent is extended or adjusted under 35 U.S.C. 154(b) by 0 days.

(21) Appl. No.: 10/192,094

(22) Filed: Jul. 10, 2002

(65) Prior Publication Data

US 2004/0010053 A1 Jan. 15, 2004

(51) Int. Cl.$^7$ .................................................. C07C 26/00
(52) U.S. Cl. ........................................ 560/157; 525/920
(58) Field of Search ........................... 560/19, 129, 157, 560/158; 564/1.5, 32

(56) References Cited

U.S. PATENT DOCUMENTS

| | | | |
|---|---|---|---|
| 3,268,561 A | 8/1966 | Peppel et al. | 260/348 |
| 4,324,575 A | 4/1982 | Levy | 65/3.11 |
| 4,618,703 A | 10/1986 | Thanawalla et al. | 560/209 |
| 5,382,642 A | 1/1995 | Guo | 526/333 |
| 5,451,652 A | 9/1995 | Guo et al. | 526/333 |
| 5,475,073 A | 12/1995 | Guo | 526/333 |
| 5,552,486 A | 9/1996 | Guo et al. | 525/118 |
| 6,530,849 B2 * | 3/2003 | Peter | 473/378 |

* cited by examiner

Primary Examiner—Johann Richter
Assistant Examiner—Karl Puttlitz
(74) Attorney, Agent, or Firm—Shao-Hua Guo

(57) ABSTRACT

A method of preparing UV-curable urethane compositions is disclosed. The method comprises two steps. First, isophorone diisocyanate (IPDI) reacts with a hydroxy-functional resin to form an NCO prepolymer. Second, the NCO prepolymer reacts with a hydroxy-functional ethylenic monomer to form the UV-curable urethane composition. The hydroxy-functional resin comprises at least about 2 wt % of recurring units of a propoxylated allylic alcohol. The method of the invention allows the preparation of UV-curable urethane compositions from acrylic polyols without gel.

21 Claims, No Drawings

PREPARATION OF UV-CURABLE URETHANE COMPOSITIONS

FIELD OF THE INVENTION

The invention relates to the preparation of UV-curable urethane compositions. More particularly, the invention relates to preparing UV-curable urethane compositions from hydroxy-functional resins comprising recurring units of propoxylated allylic alcohols.

BACKGROUND OF THE INVENTION

Urethane acrylates are known. They can be divided into two categories: monomeric and polymeric. Monomeric urethane acrylates can be made by the reaction of multifunctional isocyanates with hydroxyalkyl acrylates or methacrylates. Polymeric urethane acrylates are made by the reaction of NCO prepolymers with hydroxyalkyl acrylates or methacrylates. The commonly used NCO prepolymers are made from polyether polyols or polyester polyols. See, e.g., U.S. Pat. No. 4,324,575.

Despite their superior resistance to weathering, acrylic polyols are rarely used for making NCO prepolymers. Unlike polyether or polyester polyols, acrylic polyols are made by radical chain polymerization of hydroxyalkyl acrylates or methacrylates and alkyl acrylates or methacrylates. The hydroxyl groups are randomly pendant along the polymer chain, rather than located only at the chain ends. Also, acrylic polyols usually have more than two OH groups per chain. Thus, the reaction of acrylic polyols with diisocyanates often results in gel even under well-controlled conditions.

Isophorone diisocyanate (IPDI) is also known. It offers coatings excellent weathering stability. More importantly, IPDI has two different NCO groups, a primary aliphatic NCO group and a secondary cycloaliphatic NCO group. Under Lewis acid catalysis, the secondary NCO group is considerably more reactive than the primary NCO group. This reactivity difference makes IPDI an ideal candidate for preparing NCO prepolymers because the secondary NCO group reacts first with the OH group leaving the primary NCO group unreacted and available for further reaction. See R. Lomoelder et al., *Paintindia*, pp. 31–38, November 1998.

Nevertheless, the reaction of IPDI with acrylic polyols often results in gel. New methods for preparing UV-curable acrylic urethanes are needed. Ideally, the method would allow the direct reaction of acrylic polyols with IPDI without gel formation.

SUMMARY OF THE INVENTION

The invention is a method of preparing UV-curable urethane compositions. The method comprises two steps. First, isophorone diisocyanate (IPDI) reacts with a hydroxy-functional resin to form an NCO prepolymer. Second, the NCO prepolymer reacts with a hydroxy-functional ethylenic monomer to form the UV-curable urethane composition. The hydroxy-functional resin comprises at least about 2 wt % of recurring units of a propoxylated allylic alcohol. The method of the invention allows the preparation of UV-curable urethane compositions from acrylic polyols without gel.

DETAILED DESCRIPTION OF THE INVENTION

The method of the invention comprises two steps. First, isophorone diisocyanate (IPDI) reacts with a hydroxy-functional resin to form an NCO prepolymer. Second, the NCO prepolymer reacts with a hydroxy-functional ethylenic monomer.

The hydroxy-functional resin comprises at least about 2 wt % of recurring units of a propoxylated allylic alcohol. Preferably, the hydroxy-functional resin comprises at least about 5 wt % of recurring units of a propoxylated allylic alcohol. More preferably, the hydroxy-functional resin comprises at least about 10 wt % of recurring units of a propoxylated allylic alcohol.

The propoxylated allylic alcohol preferably has the general structure:

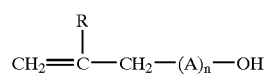

R is hydrogen, a $C_1$–$C_{10}$ alkyl, or a $C_6$–$C_{12}$ aryl group; A is an oxypropylene group; and n is an average number of oxyalkylene groups. Preferably, n is from about 1 to about 5. More preferably, n is from about 1 to about 2. Most preferably, n is about 1. Propoxylated allylic alcohol can be prepared by the reaction of allylic alcohol, such as allyl alcohol and methallyl alcohol, with propylene oxide in the presence of a base catalyst. See U.S. Pat. Nos. 3,268,561 and 4,618,703.

The hydroxy-functional resin comprises recurring units of other monomers. Suitable monomers include alkyl acrylates and methacrylates, acrylic and methacrylic acids, vinyl aromatics, vinyl halides, vinyl ethers, vinyl esters, unsaturated nitriles, allyl esters, allyl ethers, allyl carbonates, conjugated dienes, and the like, and mixtures thereof.

Examples of suitable hydroxy-functional resins include homopolymers of propoxylated allylic alcohols, copolymers of propoxylated allylic alcohols and allyl esters, copolymers of styrene and propoxylated allylic alcohols, and copolymers of alkyl acrylates or methacrylates and propoxylated allylic alcohols.

Preferably, the hydroxy-functional resin has a number average molecular weight within the range of about 500 to about 10,000. More preferably, the molecular weight is within the range of about 500 to 5,000. Preferably, the hydroxy-functional resin has a hydroxyl functionality, i.e., the number of OH group per polymer chain, within the range of about 2 to about 10. More preferably, the hydroxyl functionality is within the range of about 3 to about 8. Most preferably, the hydroxyl functionality is within the range of about 3 to about 6.

Methods for making hydroxy-functional resins are known. For instance, U.S. Pat. No. 5,552,486 teaches homopolymers of propoxylated allylic alcohol. U.S. Pat. No. 5,451,652 teaches copolymers of propoxylated allylic alcohol and allylic alcohol esters. U.S. Pat. No. 5,382,642 teaches copolymers of propoxylated allylic alcohol and styrene. U.S. Pat. No. 5,475,073 teaches acrylic polyols from propoxylated allylic alcohol. The teachings of these patents are incorporated herein by reference.

Preferably, the hydroxy-functional resin is liquid at room temperature. Examples of liquid hydroxy-functional resins are homopolymers of allyl alcohol monopropoxylate, copolymers of n-butyl acrylate and allyl alcohol monopropoxylate, copolymer of 2-ethylhexyl acrylate and allyl alcohol monopropoxylate, and copolymers of allyl acetate and allyl alcohol monopropoxylate. Liquid hydroxy-functional resins produce UV-curable urethane compositions having low viscosity.

IPDI is commercially available. The molar ratio of NCO of IPDI to OH of the hydroxy-functional resin is not critical and it depends on the desired product. When the NCO/OH molar ratio is 2 or greater, almost all of the OH groups will be reacted, and thus the final urethane composition contains essentially no OH groups. If the NCO/OH is less than 2, some OH groups will not be reacted, and the final urethane contains pendant OH groups. The latter is a so-called "dual-cure" urethane resin. It can be cured through two different mechanisms: UV-cured through the C=C unsaturation, and urethane- or melamine-cured through the OH groups.

The reaction of IPDI with the hydroxy-functional resin is preferably conducted at a temperature within the range of about 25° C. to about 125° C. More preferably, the temperature is within the range of about 40° C. to about 80° C. Urethane reaction catalysts can be used to accelerate the reaction. Suitable catalysts include tertiary amines, organozinc, and organotin compounds. Examples are stannous octoate, and dibutyltin dilaurate. The amount of catalyst used is usually less than 1% of IPDI.

A solvent is preferably used in the reaction to reduce the viscosity of the reaction mixture. Suitable solvents include ethers, esters, ketones, carbonates, aromatic and aliphatic hydrocarbons, glycol ether esters, and the like, and mixtures thereof. Ketones, ethers, esters, aromatic hydrocarbons, and mixtures thereof, are preferred. The solvent can be removed after the reaction or left in the NCO prepolymer for the reaction of the NCO prepolymer with a hydroxy-functional ethylenic monomer.

Suitable hydroxy-functional ethylenic monomers include hydroxyalkyl acrylates and methacrylates, allylic alcohols, alkoxylated allylic alcohols, and the like, and mixtures thereof. Examples are hydroxyethyl acrylate, hydroxypropyl acrylate, hydroxyethyl methacrylate, hydroxypropyl methacrylate, allyl alcohol, methallyl alcohol, propoxylated allyl alcohol, and ethoxylated allyl alcohol.

The reaction of NCO prepolymer and hydroxy-functional ethylenic monomer is preferably conducted essentially in the absence of oxygen. Preferably, a free-radical inhibitor is added to the reaction mixture to prevent the acrylate from polymerizing. Suitable free-radical inhibitors are known to the polymer industry. Examples include methyl ether hydroquinone and 2,6-di-t-butyl-4-methylphenol. Inhibitors are usually used in an amount less than 1% of the hydroxy-functional ethylenic monomer.

The reaction is preferably carried out at a temperature within the range of 25° C. to about 125° C. More preferably, the temperature is within the range of about 40° C. to about 80° C.

The method of the invention produces a fully-acrylated urethane. By "fully-acrylated urethane," we mean that the urethane acrylate has essentially no OH groups. The urethane acrylate can be cured through the ethylenic unsaturation by radiation. To make a fully-acrylated urethane, the NCO/OH molar ratio in the reaction of IPDI and hydroxy-functional resin is 2 or greater.

The method of the invention also produces a dual-cure urethane. The dual-cure urethane contains both C=C unsaturation, which undergoes radiation cure, and OH groups, which can be cured with isocyanates or melamines. To make a dual cure urethane acrylate, the NCO/OH molar ratio in the reaction of IPDI and hydroxy-functional resin is less than 2. Preferably, the dual cure urethane acrylate has about 3 C=C and about 2 OH groups per chain.

The following examples merely illustrate the invention. Those skilled in the art will recognize many variations that are within the spirit of the invention and scope of the claims.

EXAMPLE 1

Preparation of Copolymer of Allyl Alcohol Monopropoxylate and n-Butyl Acrylate Having OH# of 90 mg KOH/g A five-liter stainless-steel reactor equipped with an agitator, oil heating jacket, temperature controller, nitrogen purge device, vacuum distillation device, and pumps for monomers or initiator, is charged with allyl monopropoxylate (515 g). Butyl acrylate (1555 g) is purged with nitrogen and charged to the monomer addition pump. T-hydro 70 (180 g, t-butyl hydroperoxide, 70% aqueous solution, product of Lyondell Chemical Company) is purged with nitrogen and charged to the initiator addition pump. The reactor is purged three times with nitrogen, sealed, and the reactor contents are heated to 145° C. Butyl acrylate and initiator are added to the reactor gradually at a decreasing rate over 5 hours while maintaining the reaction temperature at 145° C. The addition rate of butyl acrylate is: hour 1: 425 g; hour 2: 385 g; hour 3: 330 g; hour 4: 270 g; hour 5: 145 g. The addition rate of the initiator is hour 1: 49 g; hour 2: 45 g; hour 3: 39 9; hour 4: 31 g; hour 5: 16 g. The reaction mixture is kept at 145° C. for another 0.5 hour following monomer and initiator addition. Unreacted monomers are removed by vacuum distillation at 155° C. The acrylic polyol (2023 g) is discharged from the reactor at 50° C., the total monomer conversion is 97.7%. It is a liquid at 25° C. and has the following composition: 18.2% allyl alcohol monopropoxylate units and 81.8% butyl acrylate units, number average molecular weight (Mn): 2500, molecular weight distribution (Mw/Mn): 2.23, hydroxyl (OH) number: 88.1 mgKOH/g, Brookfield viscosity at 25° C.: 16,300 cps, and Tg: −45° C.

EXAMPLE 2

Preparation of Copolymer of Allyl Alcohol Monopropoxylate and n-Butyl Acrylate Having OH# of 130 mg KOH/g A five-liter stainless-steel reactor equipped with an agitator, oil heating jacket, temperature controller, nitrogen purge device, vacuum distillation device, and pumps for monomers or initiator, is charged with allyl alcohol monopropoxylate (655 g). Butyl acrylate purged with nitrogen (1410 g) is charged to the monomer addition pump. t-Butyl hydroperoxide purged with nitrogen (205 g, 70% aqueous solution) is charged to the initiator addition pump. The reactor is purged three times with nitrogen, sealed, and the contents are heated to 145° C. Butyl acrylate and initiator are added to the reactor gradually at a decreasing rate over 6 hours while maintaining the reaction temperature at 145° C. The addition rate of butyl acrylate is: hour 1: 300 g; hour 2: 285 g; hour 3: 250 g; hour 4: 225 g; hour 5: 200 g; and hour 6: 150 g. The addition rate of the initiator is hour 1: 39 g; hour 2: 36.5 g; hour 3: 32 g; hour 4: 29.5 g; hour 5: 26 g; and hour 6: 20 g. The reaction mixture is kept at 145° C. for another 0.5 hour following monomer and initiator addition. Unreacted monomers are removed by vacuum distillation (maximum temperature: 150° C.). The resin is discharged from the reactor at 50° C. The liquid polyol (1394 grams) is collected with a total monomer conversion of 98.9%. It has composition: 25% allyl alcohol monopropoxylate units and 75% butyl acrylate units, number average molecular weight (Mn): 2830, molecular weight distribution (Mw/Mn): 2.47, hydroxyl number: 121 mg KOH/g, Brookfield viscosity at 25° C.: 23600 cps, and $T_g$: −48° C.

EXAMPLE 3

Preparation of Urethane Acrylate

A. Preparing NCO Prepolymer

Isophorone diisocyanate (IPDI) (168 g, product of Lyondell Chemical Company) and dibutyl tin dilaurate catalyst (0.38 g) are charged into a 1-L resin kettle equipped with a stirrer, a nitrogen inlet, a thermometer, and an addition funnel. Copolymer of Example 1 (345 g, 70% in butyl acetate solution) is gradually added to the reactor at 50° C. over an hour under agitation. Molar ratio of NCO/OH is 4/1. The reaction continues at 50° C. for an hour.

B. Reacting NCO Prepolymer with HEA

Methyl ether hydroquinone (MEHQ, 2.5 g) is added to the resulting NCO prepolymer of step A. Hydroxyethyl acrylate (HEA) (197 g) is gradually added to the reactor mixture over an hour at 60° C. The reaction continues at 60° C. for 2 hours. The product is clear. It has 83.9% solids and 4,510 cps viscosity at 25° C.

EXAMPLE 4

Preparation of Urethane Acrylate

A. Preparing NCO Prepolymer

IPDI (400 g) and dibutyl tin dilaurate (0.42 g) are charged into a reactor described in Example 3. Copolymer of Example 2 (780 g, 70% in butyl acetate) is gradually added into the reactor mixture over an hour at 50° C. The NCO/OH molar ratio is 3/1. The reaction continues at 50° C. for 30 minutes.

B. Reacting NCO Prepolymer with HEA

MEHQ (3.0 g) is added to the resulting NCO prepolymer of step A. HEA (340.0 g) is gradually added to the reactor mixture over an hour at 60° C. The reaction continues at 60° C. for 2 hours. The product is clear. It has 84.0% solids and 15,690 cps viscosity at 25° C.

EXAMPLE 5

Preparation of Urethane Acrylate

A. Preparing NCO Prepolymer

IPDI (400 g) and dibutyl tin dilaurate (0.0.85 g) are charged into a reactor described in Example 3. Copolymer of Example 2 (815 g, 70% in butyl acetate) is gradually added into the reactor mixture over an hour at 50° C. The NCO/OH molar ratio is 2.8/1. The reaction continues at 50° C. for 30 minutes.

B. Reacting NCO Prepolymer with HEA

MEHQ (3.0 g) is added to the resulting NCO prepolymer of step A. HEA (346.0 g) is gradually added to the reactor mixture over one hour at 60° C. The reaction continues at 60° C. for 2 hours after addition. The product is clear. It has 78.0% solids and 4,160 cps viscosity at 25° C.

EXAMPLE 6

Preparation of Urethane Acrylate

A. Preparing NCO Prepolymer

IPDI (320 g) and dibutyl tin dilaurate (0.85 g) are charged into a reactor described in Example 3. Copolymer of Example 2 (815 g, 70% in butyl acetate) is gradually added into the reactor mixture over one hour at 50° C. The NCO/OH molar ratio is 2/1. The reaction continues at 50° C. for 30 minutes.

B. Reacting NCO Prepolymer with HEA 2,6-Di-t-butyl-4-methylphenol (BHT, 3.0 g) is added to the resulting NCO prepolymer of step A. HEA (235.0 g) is gradually added to the reactor mixture over an hour at 60° C. The reaction continues at 60° C. for 2 hours. The product is clear. It has 76.7% solids and 7,360 cps viscosity at 25° C.

EXAMPLE 7

Preparation of Urethane Prepolymer

A. Preparing NCO Prepolymer

IPDI (60 g) and dibutyl tin dilaurate (0.154 g) are charged into a reactor described in Example 3. Copolymer of Example 1 (160 g, 70% in methyl amyl ketone) is gradually added into the reactor mixture over an hour at 25° C. The NCO/OH molar ratio is 3.1. After the addition, the reactor contents are heated to 65° C. and held at that temperature for 3 hours.

B. Reacting NCO Prepolymer with Allyl Alcohol Monopropoxylate

Allyl alcohol monopropoxylate (50.6 g, product of Lyondell Chemical Company) is gradually added to the reactor mixture over 30 minutes at 85° C. The reaction continues at 85° C. for 2 hours. The product is clear. It has 82.0% solids and 1,980 cps viscosity at 25° C.

EXAMPLE 8

Preparation of Urethane Acrylate

A. Preparing NCO Prepolymer

Copolymer of Example 2 (680 g), acetone (170 g), dibutyl tin dilaurate (0.88 grams) and BHT (2.0 g) are charged into a 2-L reactor equipped similarly to Example 3. IPDI (125 g) is gradually added into the reactor at 40° C. over an hour. The NCO/OH ratio is 1.4/1. The reaction continues at 40° C. for an hour.

B. Reacting NCO Prepolymer with HEA

HEA (78.5.0 g) is gradually added to the reactor mixture over 30 minutes at 40° C. The reaction continues at 60° C. for 4 hours after the addition. The product is clear. It has the following properties: solids %: 83.0%, viscosity: 4090 cps, OH#: 59.4 mg KOH/g, Mn: 4370, Mw: 24200, NCO content: 0.040 meq./g, IPDI diacrylate: 10.8 wt %.

Comparative Example 9

A commercial acrylic polyol, JONCRYL 920 (850 g, 80% in methyl amyl ketone, product of S C Johnson Polymer), diibutyl tin dilaurate (0.88 grams), and BHT (2.0 g) are charged into a 2-L reactor equipped similarly to Example 3. IPDI (125 g) is gradually added into the reactor at 40° C. over an hour. The reactor contents are gelled when 89 grams of IPDI is added.

Comparative Example 10

Copolymer of Example 2 (680 g), acetone (170 g), dibutyl tin dilaurate (0.88 g), and BHT (2.0 g) are charged into a 2-L reactor equipped similarly to Example 3. Hexamethylene diisocyanate (HDI, 95 g, product of Lyondell Chemical Company) is gradually added into the reactor over an hour at 40° C. The reactor contents are gelled in 25 minutes after the addition.

Comparative Example 11

IPDI (180 g), copolymer of Example 2 (200 g, 70% in methyl amyl ketone), and dibutyltin dilaurate catalyst (0.19 g) are charged into a reactor described in Example 3. The NCO/OH molar ratio is 5/1. The reaction mixture is held at 25° C. for 30 minutes and then heated to 65° C. and held at 65° C. for 3 hours. MEHQ (0.5 g) is added. HEA (158.0 g) is added over an hour at 75° C. The reaction continues at 75° C. for 3 hours. The final product is hazy and partially gelled.

Comparative Example 12

IPDI (400 g), copolymer of Example 1 (655 g, 70% in methyl amyl ketone), and dibutyl tin dilaurate (0.74 g) into a 2-L equipped similarly to Example 3. The NCO/OH molar ratio is 5/1. The reaction mixture is held at 25° C. for an hour and then heated to 65° C. and held at 65° C. for 3 hours. MEHQ (0.5 g ) is then added and the reactor is heated to 75° C. HEA (127.0 g) is added over 30 minutes. The reaction continues at 75° C. for 3 hours. The final product is hazy.

EXAMPLE 13

Coating Composition

Urethane acrylate of Example 4 (27.5 g) is mixed with UV initiator Irgacure 184 (1.9 g, 50% in n-butyl acetate, product of Ciba Specialty Chemicals). The coating composition is drawn down on a steel panel (4"×8") to a uniform wet film of thickness 2 mil. The panel passes through a fusion UV system (H-bulb). The panel is tested after five days and it gives Gloss at 20°: 91.3; Gloss at 60°: 104; Pencil Hardness: H; Adhesion (ASM 3359): 3; Gardner Impact Direct: 56; and Gardner Impact reverse: 24.

EXAMPLE 14

Coating Composition

Urethane acrylate of Example 4 (22.5 g), the urethane of Example 7 (7.5 g), and UV initiator Irgacure 184 (2.10 g) are mixed. The coating composition is drawn down on a steel panel (4"×8") to a uniform wet film of thickness 2 mil. The panel passes a fusion UV system (H-bulb). The panel is tested after five days and it gives Gloss at 20°: 88.6; Gloss at 60°: 103; Pencil Hardness: F; Adhesion (ASM 3359): 4; Gardner Impact Direct: 152; and Gardner Impact reverse: 152.

We claim:

1. A method comprising:
   (a) reacting isophorone diisocyanate with a hydroxy-functional resin comprising at least about 2 wt % of recurring units of a propoxylated allylic alcohol to form an NCO prepolymer; and
   (b) reacting the NCO prepolymer with a hydroxy-functional ethylenic monomer to form a UV-curable urethane composition, wherein the hydroxy-functional resin further comprises recurring units of a monomer selected from the group consisting of alkyl acrylates and methacrylates, acrylic and methacrylic acids, vinyl aromatics, vinyl halides, vinyl ethers, vinyl esters, unsaturated nitriles, allyl esters, allyl ethers, allyl carbonates, conjugated dienes, and mixtures thereof.

2. The method of claim 1 wherein the hydroxy-functional resin is a copolymer of a propoxylated allylic alcohol and 2-ethylhexyl acrylate.

3. The method of claim 1 wherein the hydroxy-functional resin is a copolymer of a propoxylated allylic alcohol and n-butyl acrylate.

4. The method of claim 1 wherein the hydroxy-functional resin is a homopolymer of a propoxylated allylic alcohol.

5. The method of claim 1 wherein the hydroxy-functional resin is a copolymer of a propoxylated allylic alcohol and an allyl ester.

6. The method of claim 1 wherein the hydroxy-functional resin is a copolymer of a propoxylated allylic alcohol and styrene.

7. The method of claim 1 wherein the hydroxy-functional resin has a hydroxyl functionality within the range of about 2 to about 10.

8. The method of claim 1 wherein the hydroxyl functional resin has a hydroxyl functionality within the range of about 3 to about 8.

9. The method of claim 1 wherein the hydroxy-functional resin has a hydroxy-functionality within the range of about 3 to about 6.

10. The method of claim 1 wherein the hydroxy-functional ethylenic monomer is selected from the group consisting of hydroxyalkyl acrylates, hydroxyalkyl methacrylates, allylic alcohols, and alkoxylated allylic alcohols.

11. The method of claim 1 wherein the hydroxy-functional ethylenic monomer is selected from the group consisting of hydroxyethyl acrylate, hydroxypropyl acrylate, hydroxyethyl methacrylate, hydroxypropyl methacrylate, allyl alcohol, methallyl alcohol, and propoxylated allyl alcohol.

12. The method of claim 1 wherein the hydroxy-functional ethylenic monomer is hydroxyethyl acrylate.

13. A UV-curable urethane composition made by the method of claim 2.

14. A method comprising:
   (a) reacting isophorone diisocyanate with a hydroxy-functional resin comprising at least about 2 wt % of recurring units of a propoxylated allylic alcohol in an NCO/OH molar ratio of 2 or greater to form an NCO prepolymer having essentially no hydroxyl group; and
   (b) reacting the NCO prepolymer with a hydroxy-functional ethylenic monomer to form a UV-curable urethane composition, wherein the hydroxy-functional resin further comprises recurring units of a monomer selected from the group consisting of vinyl aromatics, acrylates, and methacrylates.

15. The method of claim 14 wherein the hydroxy-functional resin has a hydroxyl functionality within the range of about 3 to about 6.

16. The method of claim 14 wherein the hydroxy-functional ethylenic monomer is hydroxyethyl acrylate.

17. A UV-curable urethane composition made by the method of claim 14.

18. A method comprising:
   (a) reacting isophorone diisocyanate with a hydroxy-functional resin comprising from about 2 to about 60 wt % of recurring units of a propoxylated allylic alcohol in an NCO/OH molar ratio less than 2 to form an NCO prepolymer having both pendant isocyanate and hydroxyl groups; and
   (b) reacting the NCO prepolymer with a hydroxy-functional ethylenic monomer to form a UV-curable urethane composition having pendant hydroxyl groups, wherein the hydroxy-functional resin further comprises recurring units of a monomer selected from the group consisting of vinyl aromatics, acrylates, and methacrylates.

19. The method of claim 18 wherein the hydroxy-functional resin has a hydroxy-functionality within the range of about 3 to about 6.

20. The method of claim 18 wherein the hydroxy-functional ethylenic monomer is hydroxyethyl acrylate.

21. A UV-curable urethane composition made by the method of claim 18.

* * * * *